United States Patent [19]

Ash et al.

[11] Patent Number: 5,440,009
[45] Date of Patent: Aug. 8, 1995

[54] RECOVERY OF CYCLIC ARYLENE SULFIDE OLIGOMERS

[75] Inventors: Carlton E. Ash, Sugarland, Tex.; William A. St. Laurent, Bartlesville, Okla.

[73] Assignee: Phillips Petroleum Company, Bartlesville, Okla.

[21] Appl. No.: 176,584

[22] Filed: Dec. 30, 1993

[51] Int. Cl.$^6$ ............................................. C08G 75/14
[52] U.S. Cl. ................................. 528/388; 528/391; 528/492; 528/493; 528/499; 562/432; 564/162; 564/430; 568/58
[58] Field of Search ............... 528/388, 491, 492, 493, 528/499; 562/432; 564/162, 430; 568/58

[56] References Cited

U.S. PATENT DOCUMENTS 4,730,034  3/1988  Nesheiwat et al. .................. 528/388
4,801,664  1/1989  Nesheiwat et al. .................. 525/537

FOREIGN PATENT DOCUMENTS 0240016  10/1987  European Pat. Off. .

Primary Examiner—Melvyn I. Marquis
Assistant Examiner—Shelley A. Dodson
Attorney, Agent, or Firm—Beverly M. Dollar

[57] ABSTRACT

A method for recovering cyclic oligomers from a poly(arylene sulfide) polymer or poly(arylene sulfide) polymerization reaction mixture is provided in which the cyclic oligomers are maintained in a solution comprising a suitable solvent and the cyclic oligomers; then the solution is contacted with water to cause the formation of a suspension; then the suspension is acidified to cause the flocculation of cyclic oligomers which can then be more easily recovered.

53 Claims, No Drawings

RECOVERY OF CYCLIC ARYLENE SULFIDE OLIGOMERS

BACKGROUND OF THE INVENTION

This invention relates to a method of recovering cyclic arylene sulfide oligomers from a solution comprising poly(arylene sulfide) polymer and a polar organic compound.

Poly(arylene sulfide) polymers are known in the art and have found wide use due to their desirable thermal and Chemical resistance. Poly(arylene sulfide) polymers are useful in the formation of films, fibers, composites and molded parts by a variety of methods known to those of skill in the art.

Oligomers and polymer by-products in poly(arylene sulfide) polymer products may contribute to certain processing and final product problems. Problems attributed to high oligomer concentrations in the polymer include mold plate out, die face build up, exhaust duct fouling, bubble formation in molded parts, corrosion, injection molding drool and off gassing during injection molding. Solvent extraction methods can be used to remove some of the oligomers and other impurities from poly(arylene sulfide) products.

Other impurities might include, for example, unreacted dihaloaromatic compounds, tri- or tetrahaloaromatic compounds, residual polar organic compounds, inorganic salts, or other by-products associated with poly(arylene sulfide) polymerization or recovery.

When past attempts have been made to remove nonpolymeric impurities, cyclic and linear oligomers from s poly(arylene sulfide) polymer or polymerization mixture, difficulties have been experienced in filtering the oligomer solids, primarily due to the extremely fine particle size and tackiness of the cyclic oligomers. It would be desirable to have an easier method for removing and recovering nonpolymeric impurities and oligomers.

Once the oligomers and impurities are removed from the poly(arylene sulfide) polymer, they must be disposed of in some manner. It has recently been discovered that cyclic oligomers can be used as a reactant in a subsequent poly(arylene sulfide) polymerization. However, no simple and effective method has existed to recover cyclic oligomers from linear oligomers and other impurities removed from a poly(arylene sulfide) polymer or spent: polymerization reaction mixture.

It is an object of this invention to provide a method for recovering cyclic oligomers from a poly(arylene sulfide) polymer, or spent polymerization reaction mixture, or recovering cyclic oligomers from admixture with linear oligomers and impurities removed from a poly(arylene sulfide) polymer or spent polymerization reaction mixture.

SUMMARY OF THE INVENTION

In accordance with one embodiment of this invention, linear and cyclic oligomers and dissolved impurities from a poly(arylene sulfide) polymer or spent polymerization reaction mixture are subjected to a process to recover the cyclic oligomers from the other components. At least a portion of the cyclic and linear oligomers and non-polymeric impurities are dissolved in a suitable solvent to form a solution and are then contacted with an amount of water sufficient to precipitate and allow easy removal of the linear oligomers. Further addition of water forms a suspension of cyclic oligomers which is not easily separated due to its colloidal nature. Acidification of the suspension results in the flocculation of the cyclic oligomers which are then easily separated from the remainder of the mixture.

In order to separate the polymer from the oligomers and impurities according to an aspect of this invention; the polymer is contacted with a suitable solvent at a temperature above that at which the polymer, oligomers and impurities dissolve in the solvent. An initial charge of water is added either before, during, or after polymer dissolution or even after polymer solidification and optionally polymer recovery. The initial water charge serves to precipitate the majority of linear oligomers which may be removed by common solid/liquid separation techniques. The remaining solution containing cyclic oligomers and any non-polymeric impurities are treated with an additional water charge and treated as described above in order to recover the cyclic oligomers.

In order to separate the polymer from the oligomers and impurities according to another aspect of this invention, a poly(arylene sulfide) polymer or spent polymerization reaction mixture is contacted with or maintained in a suitable solvent at temperatures sufficient to dissolve at least a portion of the cyclic and linear oligomers and other impurities, but not high enough to dissolve the poly(arylene sulfide) polymer. Then the slurry is subjected to a separation to remove the solid purified poly(arylene sulfide) polymer product, thereby removing dissolved oligomers and any dissolved non-polymeric impurities from the poly(arylene sulfide) polymer and any solid impurities remaining. Then the dissolved cyclic and linear oligomers and impurities are treated as described above in order to recover the cyclic oligomers.

In accordance with a second embodiment of this invention, in which the amount of cyclic oligomers recovered is maximized, cyclic oligomers are removed from is poly(arylene sulfide) polymer by contacting such poly(arylene sulfide) polymer with s polar organic compound and water to form a two-phase system consisting of s polymer-lean less dense phase and a polymer-rich denser phase; thus extracting the less dense phase in which the majority of the cyclic oligomers are soluble. The less dense phase can then be treated as described above in order to recover the cyclic oligomers.

If desired, the invention may be used to more easily recover the total oligomer content—linear and cyclics. Water is added to separate the oligomers from the solvent; the mixture is acidified to flocculate the cyclic oligomers; and the linear and cyclic oligomers are removed together by any convenient solids recovery process.

DESCRIPTION OF THE PREFERRED EMBODIMENTS

The poly(arylene sulfide) polymers useful in this invention are those prepared according to any method known to those of ordinary skill in the art, such as, for example, those disclosed in U.S. Pat. No. 3,354,129, U.S. Pat. No. 3,919,177, U.S. Pat. No. 4,038,261, U.S. Pat. No. 4,038,262, U.S. Pat. No. 4,116,947, U.S. Pat. No. 4,282,347, U.S. Pat. No. 4,350,810, and U.S. Pat. No. 4,645,826. The poly(arylene sulfide) polymer is generally prepared by contacting reactants comprising a dihalosubstituted aromatic compound, a sulfur source and a polar organic compound, optionally in the presence of alkali metal carboxylates and/or polyhaloaromatic compounds, under polymerization conditions to form a polymerization reaction mixture.

Examples of poly(arylene sulfide) polymers suitable for purposes of this invention include poly(2,4-toluene sulfide), poly(4,4'-biphenylene sulfide) and poly(p-phenylene sulfide). Because of its availability and desirable properties (such as high chemical resistance, non-flammability, and high strength and hardness) poly(p-phenylene sulfide) is the presently preferred poly(arylene sulfide) polymer.

During the preparation of the poly(arylene sulfide) polymer, certain by-products and oligomers are formed. These non-polymeric by-products and oligomers can become associated with the poly(arylene sulfide) polymer during recovery. The term "oligomers" as used herein, is generally meant to denote compounds containing units contributed by the monomers in numbers less that about 15. The oligomers present can be cyclic and linear oligomers. Such cyclic oligomers will generally have the formula

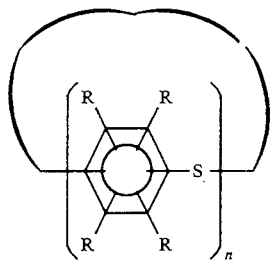

where $4 \leq n \leq 15$, and each R is individually selected from the group consisting of hydrogen, alkyl, aryl, alkylaryl and arylalkyl groups, having 1 to 10 carbon atoms.

Linear oligomers contained in the waste material will generally have the formula

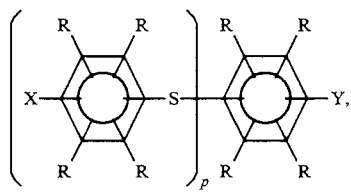

where X and Y are end-groups occurring as by-products of the polymerization, $0 \leq p \leq 15$ and R is as defined above. End groups that will typically be present are hydrogen atoms; halogen atoms; thiols and the salts thereof; phenoxy groups; hydroxyls and the salts thereof; cyclic amide groups; carboxylic acids having from 1 to 10 carbon atoms and the salts thereof; substituted and unsubstituted amine groups of the formula

having 1–10 carbon atoms, where R is as defined above; and combinations thereof.

Non-polymeric impurities include unreacted monomer and other reaction materials such as alkali metal carboxylates, and the products of side reactions and like materials. The non-polymeric impurities which can be removed by dissolving them in the suitable solvent are not meant to include alkali metal halide produced as a by-product in the reaction. This alkali metal halide by-product material is typically removed during conventional recovery of the poly(arylene sulfide) polymer. If the poly(arylene sulfide) polymer employed in this invention contains such alkali metal halide, it is preferred to remove it as much as is reasonably possible prior to contacting the poly(arylene sulfide) polymer, oligomers and non-polymeric impurities with the suitable solvent. Removal of the alkali metal halide can be effected, for example, by washing the polymer with water, optionally at elevated temperatures.

Cyclic and linear oligomers can be separated from a poly(arylene sulfide) polymerization reaction mixture by cooling the reaction mixture to a temperature at which poly(arylene sulfide) polymer present solidifies, but above that temperature at which cyclic and linear oligomers solidify. The mixture is subjected to a solids-liquid separation and the removed liquid is treated according to the invention process to recover cyclic oligomers.

The solution containing linear and cyclic oligomers is contacted with an amount of water sufficient to cause the linear oligomers to precipitate; then the linear oligomers are removed. Additional water is added to the remaining solution containing cyclic oligomers to form a suspension of cyclic oligomers; then the suspension is acidified, resulting in the flocculation of the cyclic oligomers, allowing for their removal by conventional solids-liquid separation means.

Alternatively, the linear and cyclic oligomers can be removed together by contacting the solution containing both types of oligomers with an amount of water sufficient to precipitate the linear oligomers and form a suspension of the cyclic oligomers; then the entire mixture can be acidified, flocculating the cyclic oligomers and allowing the separation of the linear and cyclic oligomers from the liquid.

Cyclic and linear oligomers can also be produced in a process to purify an already recovered poly(arylene sulfide) polymer. For example, a recovered poly(arylene sulfide) polymer can be contacted with a solvent to dissolve a portion of the lower molecular weight material and non-polymeric impurities, and the polymer can be recovered by a solids-liquid separation and the liquid containing dissolved lower molecular weight material and impurities can be treated as described above.

In one aspect of the first embodiment of this invention, the polymer is contacted with the solvent at a temperature above that at which the polymer, oligomers and impurities dissolve in the solvent; then the solution is cooled to a temperature at which the polymer solidifies; then the solid polymer is separated from the oligomers and impurities which remain in solution. The solution is then treated as described to recover the oligomers, separately or together.

In another aspect of the first embodiment of this invention, the polymer is contacted with the solvent at temperatures sufficient to dissolve a portion of the oligomers and impurities but below the temperature at which the polymer dissolves. The dissolved oligomers and impurities can then be separated from the solid polymer, and treated as described to recover the cyclic and linear oligomers.

In a second embodiment of this invention, the amount of cyclic oligomers recovered is maximized by contacting a poly(arylene sulfide) polymer with a polar organic compound and water in amounts sufficient to form two phases consisting of a less dense polymer-lean phase and a more dense polymer-rich phase. By "polymer-lean" phase, it is meant that the phase contains relatively smaller amounts of polymer when compared to the polymer-rich phase. While not wishing to be bound by theory, it is presently believed that the majority of the cyclic oligomers are present in the polymer-lean phase. Thus, the polymer-lean phase can be extracted from the two phase system and contacted first with an amount of water sufficient to precipitate any linear oligomers, which can be removed; then the remaining liquid is contacted with additional water to form a suspension of cyclic oligomers in the phase, then the suspension is acidified to flocculate the cyclic oligomers which can then be more easily removed from the liquid.

Any suitable solvent can be used in this invention. Suitable solvents are those in which the oligomers and optionally non-polymeric impurities can be substantially dissolved. Such solvents should remain liquid at the temperatures and pressures involved. Solvents useful in this invention to dissolve the poly(arylene sulfide), polymer and/or oligomers and non-polymeric impurities include, but are not limited to, amides, lactams, sulfones, ethers, and ketones. Examples of amides and lactams which may be useful in the present invention include tetramethyl urea, N,N'-ethylenedipyrrolidone, N-methyl-2-pyrrolidone, N-ethylpyrrolidone, N-cyclohexylpyrrolidone, caprolactam, N-methylcaprolactam, and hexamethylphosphoramide. Possible sulfones useful as solvents in the present invention include sulfolane, diphenyl sulfone, and chlorinated diphenylsulfones. Examples of sulfides possibly useful in the present invention are diphenyl sulfide and halogenated diphenyl suicides. Ethers which may be useful as solvents in the present invention include diphenyl ether and halogenated diphenyl ethers. Ketones which can be used as solvents in the present invention include 1,3-diphenyl-2-propanone, 4,4'-dimethoxybenzophenone, and benzophenone.

Any suitable amount of solvent may be used to dissolve the poly(arylene sulfide) polymer and/or oligomers and impurities. The amount of solvent used should be that which is sufficient to dissolve as much of the poly(arylene sulfide) polymers and/or oligomers and impurities as possible. It is presently preferred to employ an amount of solvent such that the concentration of poly(arylene sulfide) polymer in the solvent is below about 50 weight % in order to utilize slurry-handling equipments. The upper limit on the amount of solvent used will be based on practical (equipment) and economic considerations. It is presently preferred not to exceed a solvent to oligomer and impurities, or polymer, weight ratio of about 10 to 1.

Any suitable temperature can be used for the step in which the poly(arylene sulfide) polymer and/or oligomers and optionally non-polymeric impurities are dissolved in the suitable solvent, or any suitable temperature can be used for the temperature at which the dissolved oligomers are removed from the poly(arylene sulfide) polymer. Generally, the temperature will be in the range of ambient temperature to about 300° C. The temperature will vary according to which solvent is employed and whether additional compounds and/or poly(arylene sulfide) polymer are present. For purposes of removing cyclic oligomers, it is preferred to employ ambient temperature since ambient temperature is sufficient to allow dissolution of at least a portion of the cyclic oligomers in the suitable solvent. If a maximized amount of impurities and both cyclic and linear oligomers are to be removed from the poly(arylene sulfide) polymer, it is presently preferred to operate at higher temperatures. For example, the temperature required for dissolution of the majority of the oligomers and certain non-polymeric impurities in the solvent N-methyl-2-pyrrolidone is typically about 140° C. to about 205° C. Generally, temperatures exceeding about 300° C. should be avoided since any poly(arylene sulfide) polymer present could begin to degrade or react and/or the solvent could begin to boil at above this temperature. In addition, it is preferred to agitate the slurry in order to further promote dissolution of the oligomers and impurities.

The time period required to contact the solvent with the oligomers and impurities and optionally polymer is that amount of time necessary for substantial dissolution of the oligomers and impurities, and optionally polymer. Generally the time will vary from the amount of time necessary to achieve contact of the solvent with the oligomers and impurities and optionally polymer, up to a period of about 75 minutes. Although longer times could be employed, the amount of additional oligomers and impurities, and optionally polymer, dissolved would not typically justify the cost of lengthening the production process. It is presently preferred to contact the solvent with the oligomers and impurities and optionally polymer for a time period of no more than about 30 minutes.

After dissolution of the oligomers and non-polymeric impurities, and, optionally polymer, separation of any solids from the solution is initiated. While any suitable temperature which allows for separation of solids (including any polymer) from a portion of oligomers and impurities can be employed during the separation process, the slurry temperature is preferably maintained at ambient during the separation process in order to maximize the amount of the dissolved cyclic oligomers but to avoid the recovery and need for further separation of other impurities which might remain in solution at elevated temperatures. For example, if poly(arylene sulfide) polymer is contained in the slurry, the filtration will generally be performed in the most preferred embodiment at ambient temperature.

The separation step can be performed in any manner known to those of ordinary skill in the art for separating solids from liquids, such as, for example, filtration or centrifugation. Any resultant solid poly(arylene sulfide) polymer may be washed or extracted with solvent to remove remaining minor amounts of oligomers and/or impurities and one or more deionized water washes at an elevated temperature to remove solvent remaining with the polymer.

According to both embodiments of this invention, the dissolved cyclic and any linear oligomers and impurities which have been separated from the poly(arylene sulfide) polymer or spent poly(arylene sulfide) reaction mixture are subjected to a process to recover the cyclic oligomers.

The oligomers and any other impurities dissolved in the suitable solvent are first contacted with an amount of water sufficient to precipitate linear oligomers in the solution. If the cyclic oligomers are to be recovered separately, the amount of water added in this step should be enough to cause precipitation of the linear oligomers while not causing the formation of the suspension of the cyclic oligomers. The amount of water to be added can vary, based on factors such as the compounds present in the solution and the temperature of the solution. It is preferred to add an amount of water in the range of about 0.1 to about 1.0 mole water per mole of suitable solvent, most preferably 0.25-0.50 mole water per mole solvent, to precipitate the linear oligomers.

After removal of the precipitated linear oligomers, the remaining solution is contacted with an additional amount of water to form a suspension of the cyclic oligomers. The upper limit on the amount of water added will be dictated by practical considerations, such as equipment size. Preferably, the amount added will be within the range of about 0.50 to about 50 moles water per mole of solvent, most preferably 1.0-6.0 moles water per mole solvent.

If it is desired to recover the linear and cyclic oligomers together, the water is added in one step in an amount in the range of about 0.5 to about 50 moles water per mole solvent.

The steps for the precipitation and for the formation of the suspension can take place at any suitable temperature. It is presently preferred to operate at about ambient temperature due to convenience and the good results obtained.

The addition of water to precipitate the linear oligomers and to form the suspension of the cyclic oligomers can be performed over any suitable time period. The addition time need only be limited by the method and equipment used for the addition.

After the suspension has been formed, the suspension is acidified in order to flocculate the cyclic oligomers. The term "flocculate" as used herein, is meant to denote a process to form an aggregation of solids which can be easily recovered by suitable solids-liquids separations means. Any suitable acidifying agent which is at least partially miscible with the suitable solvent can be used in the acidification step. The form of the acidifying agent can be gaseous, solid or liquid provided that the suspension can be acidified by use of that form.

Examples of suitable organic acids to be used in the acidification step include, but are not limited to, acetic acid, formic acid, oxalic acid, fumaric acid, and monopotassium phthalic acid. The presently preferred organic acid is acetic acid. Examples of suitable inorganic acids include, but are not limited to, hydrochloric acid, monoammonium dihydrogen phosphate, sulfuric acid, phosphoric acid, boric acid, nitric acid, sodium dihydrogenphosphate, and carbonic acid. The presently preferred inorganic acid is hydrochloric acid.

The amount of acid employed in the acidification step is that amount sufficient to cause flocculation of the cyclic oligomers. It is most preferred to use an amount of acid sufficient to cause the pH of the slurry comprising the flocculated cyclic oligomers, solvent and dissolved impurities to be at or below about 4.

The suspension can be acidified at any suitable temperature. It is presently preferred to use ambient temperatures due to convenience and the good results obtained.

The acidification of the suspension can be performed over any suitable time period. One of ordinary skill in the art can determine a suitable time based on equipment limitations.

The flocculated cyclic oligomers can be separated from the solution containing any other impurities by any suitable method, such as, for example, filtration or centrifugation.

The product cyclic oligomers produced by the invention method can be used as a reactant in a subsequent poly(arylene sulfide) polymerization if desired, or for any other desired use.

A further understanding of the present invention and its advantages will be provided by reference to the following examples. The examples are provided merely to illustrate the practice of the invention and should not be read as limiting the scope of the invention or the appended claims in any way. Reasonable variations and modifications, not departing from the essence and spirit of the invention, are contemplated to be within the scope of patent protection desired and sought.

EXAMPLES

In the following examples, the poly(phenylene sulfide) (PPS) melt flow rates were determined by the method of ASTM D 1238-86, Procedure B-Automatically Timed Flow Rate Procedure, Condition 316/5.0, modified to use a 5 minute preheat. The values of flow rate are expressed as grams per ten minutes (g/10 min). A modified version of the flow rate test, the extrusion rate test, is used for lower molecular weight poly(arylene sulfide) polymers and for oligomers. In the following examples, the polymer extrusion rates, reported as grams per 10 minutes (g/10 min), were determined by the method of ASTM D 1238, Condition 316/0.345, modified to use a 5 minute preheat time. The orifice used for measuring the extrusion rate had a 2.096±0.005 mm diameter and a 31.75±0.05 mm length. The orifice used for measuring the melt flow had a 2.096±0.005 mm diameter and a 8.000±0.025 mm length.

Polymer molecular weight determinations were carried out on a specially constructed high temperature gel permeation chromatography instrument connected to a flame ionization detector. Determinations were performed at 220° C. using 1-chloronaphthalene as the mobile phase. Results are reported in terms of the weight average molecular weight (Mw) in units of grams per mole (g/mol) and are based on polystyrene standards.

Example I

This example demonstrates the removal and recovery of cyclic oligomers from a poly(phenylene sulfide) (PPS) polymer.

A 48.673 g sample of PPS polymer, obtained from Phillips Petroleum Company, designated as PR-11 having a nominal extrusion rate of 30-70 g/10 min was placed with 624.54 g NMP in a one-liter 316 stainless stirred autoclave. The reactor was deoxygenated six times with nitrogen, then heated to 90° C. The reactor was deoxygenated two more times with nitrogen while continuing heating and stirring (100 rpm). When a reactor temperature of 95° C. was reached, 48.61 g of deionized, degassed water was charged. The reactor contents were then heated to 265° C. and held at that temperature for three hours. Stirring was discontinued and the reactor contents were allowed to cool slowly overnight.

The upper NMP/water phase which had formed was separated from the solid mass of PPS polymer. This top phase was filtered to remove suspended polymer and linear oligomers; the filtrate was retained (704.8 g), the filter cake was washed with deionized water at 80°–90° C. six times. The filter cake was dried in a vacuum oven at 110° C. overnight.

To a 505.30 g sample of tile clear filtrate, approximately 70 g deionized water was added, upon which the formation of a milky white suspension was observed. Additional water was added to bring the total to 100.13 g. The pH of the mixture was measured to be 7. Recovery of the cyclic oligomers from the milky suspension was not possible by simple methods such as filtration or centrifugation.

Then 9.39 g of 6N hydrochloric acid (HCl) were added, which resulted in the flocculation of the suspension, forming a fluffy white precipitate which was easily filterable.

To maximize recovery of the precipitate, first 100.47 g water, then 200.56 g water and 1.03 g HCl were added to the mixture. The mixture was filtered. To the resulting filtrate was added first 203.28 g water (in 50 g increments), then 1.10 g HCl, then an additional 50.83 g of water. No precipitate formation was observed with the last additions, The filter cake from above was dried in a vacuum oven at 110° C. for 45 minutes. The white material turned brown upon drying. Approximately 1 gram was recovered. The material was characterized by a gas chromatography mass spectroscopy, was found to constitute predominantly cyclic oligomers.

Example II

Another sample of PPS (PR-11) was treated in the same manner as described in Example I, however the entire NMP/water liquid mixture was collected after filtration to remove polymer and linear oligomers and treated as described in Example I. The filtrate (613.38 g) was mixed with 226 g deionized water and 89 g 6N HCl with gentle mixing, then with 224 g water and 6.4 g HCl. The resulting mixture was allowed to sit overnight, then filtered. The filter cake was washed four times with water and once with methanol and dried in a vacuum oven at ambient temperature. No observable color change occurred during the drying at ambient temperature. Time product yield was 1.632 g; the product was analyzed by non-aqueous reverse phase high pressure liquid chromatography using methylene chloride as a solvent and a $\mu$ Bondapak C-18 column in conjunction with a UV detector. Results indicated that the material was almost entirely composed of cyclic oligomers.

That which is claimed is:

1. A method for recovering cyclic oligomers from admixture with linear oligomers and non-polymeric impurities resulting from the polymerization of a poly(arylene sulfide) polymer, which method comprises the steps of:
   a) separating a poly(arylene sulfide) polymer from a spent polymerization reaction mixture comprising a solvent capable of substantially dissolving said oligomers and non-polymeric impurities, cyclic oligomers, linear oligomers, and non-polymeric impurities at a temperature sufficient to maintain at least a portion of said oligomers and impurities in a solution;
   b) then contacting said solution containing said cyclic and linear oligomers and non-polymeric impurities with an amount of water sufficient to cause the precipitation of said linear oligomers;
   c) separating the thus precipitated linear oligomers from said solution;
   d) contacting said solution with an additional amount of water sufficient to cause the formation of a suspension of said cyclic oligomers;
   e) then acidifying said suspension to flocculate said cyclic oligomers; and
   f) recovering said cyclic oligomers.

2. A method as recited in claim 1, wherein said solvent is selected from the group consisting of amides, lactams, and pyrrolidones.

3. A method as recited in claim 1, wherein said poly(arylene sulfide) is poly(phenylene sulfide).

4. A method as recited in claim 3, wherein said solvent, oligomers, and non-polymeric impurities are maintained at a temperature in the range of about ambient temperature to about 300° C.

5. A method as recited in claim 4, wherein said solvent is N-methyl-2-pyrrolidone.

6. A method according to—claim 1 wherein the amount of water employed in step b) is in the range of about 0.1 to about 1.0 moles water per mole of solvent.

7. A method according to claim 1 wherein the amount of water employed in step d) is in the range, of about 0.5 to about 50 moles water per mole of solvent.

8. A method according to claim 1 wherein the pH of said suspension after said acidification step e) is below about 4.

9. A method according to claim 1, wherein said acidification step comprises contacting said suspension with a hydrochloric acid solution.

10. A method for recovering cyclic oligomers from a mixture comprising poly(arylene sulfide) polymer, a polar organic compound, cyclic and linear oligomers and non-polymeric impurities, which method comprises the steps of:
    a) contacting or maintaining said mixture comprising said poly(arylene sulfide) polymer, said polar organic compound, cyclic and linear oligomers, and non-polymeric impurities under conditions sufficient to achieve two liquid phases consisting of a polymer-rich liquid phase and a polymer-lean liquid phase, wherein the majority of the cyclic oligomers are present in said polymer-lean phase;
    b) separating said polymer-lean phase containing the majority of said cyclic oligomers from said polymer-rich phase;
    c) contacting said polymer-lean phase with an amount of water sufficient to cause the precipitation of any linear oligomers present in said polymer-lean phase;
    d) removing the thus-precipitated linear oligomers;
    e) contacting said polymer-lean phase containing said cyclic oligomers with an amount of water sufficient to cause the formation of a suspension,
    f) acidifying said suspension in order to flocculate said cyclic oligomers, and
    g) recovering said cyclic oligomers.

11. A method according to claim 10 wherein said polar organic compound is N-methyl-2-pyrrolidone.

12. A method according to claim 11 wherein said poly(arylene sulfide) is poly(p-phenylene sulfide).

13. A method according to claim 12 wherein said temperature is in the range of ambient temperature to about 300° C.

14. A method according to claim 12 wherein said temperature is ambient temperature.

15. A method according to claim 10 wherein the amount of water employed in step c) is in the range of about 0.1 to about 1.0 moles water per mole solvent.

16. A method according to claim 10 wherein the amount of water employed in step e) is in the range of about 0.5 to about 50 moles water per mole solvent.

17. A method according to claim 10 wherein the pH of the suspension after step f) is below about 4.

18. A method for removing cyclic oligomers from a poly(arylene sulfide) composition comprising poly(arylene sulfide) polymer, cyclic and linear oligomers and non-polymeric impurities, which method comprises the steps of:
  a) contacting or maintaining said composition comprising poly(arylene sulfide) polymer, cyclic and linear oligomers, and non-polymeric impurities, with a solvent capable of substantially dissolving said cyclic and linear oligomers and non-polymeric impurities at a first temperature sufficiently high to substantially dissolve said cyclic and linear oligomers, non-polymeric impurities, and said polymer, thereby forming a solution;
  b) cooling said solution to a temperature at which said poly(arylene sulfide) polymer solidifies, thereby forming a slurry;
  c) removing said poly(arylene sulfide) polymer from said slurry at a second temperature sufficiently high to maintain at least a portion of said oligomers and impurities dissolved in said solvent but not high enough to dissolve said polymer;
  d) contacting said solvent containing said oligomers and impurities with an amount of water sufficient to cause the precipitation of said linear oligomers;
  e) removing the thus precipitated linear oligomers;
  f) contacting said solvent containing said cyclic oligomers and impurities with an amount of water sufficient to cause the formation of a suspension of said cyclic oligomers;
  g) acidifying said suspension in order to flocculate said cyclic oligomers, and
  h) recovering said cyclic oligomers.

19. A method according to claim 18, wherein said solvent is selected from the group consisting of amides, lactams, sulfones, sulfides, ethers, and ketones.

20. A method according to claim 18 wherein the amount of water employed in step d) is in the range of about 0.1 to about 1.0 moles water per mole of solvent.

21. A method according to claim 18 wherein the amount of water employed in step f) is in the range of about 0.5 to about 50 moles water per mole of solvent.

22. A method according to claim 18 wherein the pH of said suspension after said acidification step g) is below about 4

23. A method according to claim 18, wherein said acidification step comprises contacting said suspension with an acidic solution.

24. A method according to claim 18 wherein said solvent is N-methyl-2-pyrrolidone.

25. A method according to claim 18 wherein said poly(arylene sulfide) is poly(p-phenylene sulfide).

26. A method according to claim 18 wherein said second temperature is in the range of about 140° C. to about 205° C.

27. A method according to claim 18 wherein said second temperature is ambient temperature.

28. A method for removing cyclic oligomers from a poly(arylene sulfide) composition comprising poly(arylene sulfide) polymer, cyclic and linear oligomers and non-polymeric impurities, which method comprises the steps of:
  a) contacting or maintaining said composition comprising poly(arylene sulfide) polymer, cyclic and linear oligomers, and non-polymeric impurities with a solvent capable of substantially dissolving said oligomers and nonpolymeric impurities at a temperature sufficient to dissolve at least a portion of said cyclic and linear oligomers and non-polymeric impurities, but not high enough to dissolve said polymer, thereby forming a slurry;
  b) separating said poly(arylene sulfide) polymer from said solvent containing said oligomers and impurities at a second elevated temperature sufficiently high to maintain said oligomers and impurities dissolved in said solvent but not high enough to dissolve said polymer;
  c) contacting said solvent containing said oligomers and impurities with an amount of water sufficient to cause the precipitation of said linear oligomers;
  d) removing said linear oligomers;
  e) contacting said solvent containing said cyclic oligomers and impurities with an amount of water sufficient to form a suspension of said cyclic oligomers;
  f) acidifying said suspension in order to flocculate said cyclic oligomers, and
  g) recovering said cyclic oligomers.

29. A method according to claim 27 wherein the amount of water employed in step c) is in the range of about 0.1 to about 1.0 moles water per mole of solvent.

30. A method according to claim 27 wherein the amount of water employed in step e) is in the range of about 0.5 to about 50 moles water per mole of solvent.

31. A method according to claim 27 wherein the pH of said suspension after said acidification step e) is below about 4.

32. A method according to claim 27, wherein said acidification step comprises contacting said suspension with an acidic solution.

33. A method as recited in claim 27, wherein said solvent is selected from the group consisting of amides, lactams, sulfones, sulfides, ethers and ketones.

34. A method according to claim 33 wherein said solvent is N-methyl-2-pyrrolidone.

35. A method according to claim 27 wherein said poly(arylene sulfide) is poly(p-phenylene sulfide).

36. A method according to claim 27 wherein said second temperature is in the range of about 140° to about 205° C.

37. A method according to claim 27 wherein said second temperature is ambient temperature.

38. A method for recovering cyclic oligomers and linear oligomers from a solution resulting from the polymerization or purification of a poly(arylene sulfide) polymer comprising cyclic oligomers, linear oligomers, non-polymeric impurities and a solvent capable of substantially dissolving said oligomers and non-polymeric impurities, which method comprises the steps of:
  a) contacting said solution comprising said solvent, said cyclic and linear oligomers and non-polymeric impurities with an amount of water sufficient to cause the precipitation of said linear oligomers and the formation of a suspension of said cyclic oligomers;
  b) then acidifying said linear oligomers and said suspension to flocculate said cyclic oligomers; and
  c) recovering said linear and cyclic oligomers.

39. A method as recited in claim 38, wherein said solvent is selected from the group consisting of amides, lactams and pyrrolidones.

40. A method as recited in claim 38, wherein said poly(arylene sulfide) is poly(phenylene sulfide).

41. A method as recited in claim 40, wherein said solvent, oligomers, and non-polymeric impurities are maintained at a temperature in the range of about ambient temperature to about 300° C.

42. A method as recited in claim 39, wherein said solvent is N-methyl-2-pyrrolidone.

43. A method according to claim 38 wherein the amount of water employed in step b) is in the range of about 0.5 to about 50 moles water per mole of solvent.

44. A method according to claim 38 wherein the pH of said suspension after said acidification step c) is below about 4.

45. A method according to claim 38, wherein said acidification step comprises contacting said suspension with a hydrochloric acid solution.

46. A method for removing cyclic oligomers from a poly(arylene sulfide) composition comprising poly(arylene sulfide) polymer, cyclic and linear oligomers and non-polymeric impurities, which method comprises the steps of:
  a) contacting or maintaining said composition comprising poly(arylene sulfide) polymer, cyclic and linear oligomers, and non-polymeric impurities, with a solvent capable of substantially dissolving said oligomers and non-polymeric impurities and an amount of water in the range of about 0.1 to 1.0 moles water per mole solvent, at a first temperature sufficiently high to substantially dissolve said cyclic and linear oligomers, non-polymeric impurities, and said polymer, thereby forming a solution;
  b) cooling said solution to a second temperature at which said poly(arylene sulfide) polymer and said linear oligomers solidify, thereby forming a slurry;
  c) removing said poly(arylene sulfide) polymer and said linear oligomers from said slurry at a second temperature sufficiently high to maintain at least a portion of said cyclic oligomers and impurities dissolved in said solvent but not high enough to dissolve said polymer and said linear oligomers;
  d) contacting said solvent containing said cyclic oligomers and impurities with an amount of water sufficient to cause the formation of a suspension of said cyclic oligomers;
  e) acidifying said suspension in order to flocculate said cyclic oligomers, and
  f) recovering said cyclic oligomers.

47. A method according to claim 46, wherein said solvent is selected from the group consisting of amides, lactams, sulfones, sulfides, ethers and ketones.

48. A method according to claim 46 wherein the amount of water employed in step d) is in the range of about 0.5 to about 50 moles water per mole of solvent.

49. A method according to claim 46 wherein the pH of said suspension after said acidification step e) is below about 4.

50. A method according to claim 46, wherein said acidification step comprises contacting said suspension with an acidic solution.

51. A method according to claim 46 wherein said solvent is N-methyl-2-pyrrolidone.

52. A method according to claim 46 wherein said poly(arylene sulfide) is poly(p-phenylene sulfide).

53. A method according to claim 46 wherein said second temperature is ambient temperature.

* * * * *